United States Patent
Jewell et al.

(10) Patent No.: US 10,018,514 B2
(45) Date of Patent: Jul. 10, 2018

(54) COOKTOP TEMPERATURE SENSORS AND METHODS OF OPERATION

(71) Applicant: General Electric Company, Schenectady, NY (US)

(72) Inventors: Robert William Jewell, Louisville, KY (US); Gregory Michael Thomas, Louisville, KY (US); Jimmy Nelson Knight, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1181 days.

(21) Appl. No.: 14/181,808

(22) Filed: Feb. 17, 2014

(65) Prior Publication Data

US 2015/0233770 A1  Aug. 20, 2015

(51) Int. Cl.
| | |
|---|---|
| *G01K 7/16* | (2006.01) |
| *F24C 3/12* | (2006.01) |
| *G05B 15/02* | (2006.01) |
| *G01K 1/14* | (2006.01) |
| *F24C 15/10* | (2006.01) |
| *G01K 7/42* | (2006.01) |

(52) U.S. Cl.
CPC .............. *G01K 1/143* (2013.01); *F24C 15/10* (2013.01); *G01K 7/42* (2013.01); *G01K 2207/06* (2013.01)

(58) Field of Classification Search
CPC .......... F24C 15/10; G01K 7/42; G01K 1/143; G01K 2207/06
USPC ......... 700/299; 702/136; 99/331, 342, 329 R
See application file for complete search history.

(56) References Cited

U.S. PATENT DOCUMENTS

| | | | | |
|---|---|---|---|---|
| 239,511 | A | * | 3/1881 | Kindelan .................. E01B 5/16 238/51 |
| 242,546 | A | * | 6/1881 | Lawton et al. ........ B01D 3/009 422/610 |
| 2,365,881 | A | * | 12/1944 | Kahn ........................ F24B 7/02 126/114 |
| 2,764,662 | A | * | 9/1956 | Conkling .............. F24C 15/106 219/448.14 |

(Continued)

FOREIGN PATENT DOCUMENTS

| | | |
|---|---|---|
| EP | 1 217 874 A2 | 6/2002 |
| JP | 2004335342 | 11/2004 |

*Primary Examiner* — Eric Stapleton
(74) *Attorney, Agent, or Firm* — Dority & Manning, P.A.

(57) ABSTRACT

Cooktop temperature sensors and methods of operation are provided. An example cooktop appliance includes a cooktop element and a cooktop temperature sensor assembly. The cooktop temperature sensor assembly includes three springs providing support for a platform upon which a cooking vessel rests. The cooktop temperature sensor assembly includes a resistance temperature detector electrically connected to at least two of the three springs. The cooktop appliance includes a processor and a memory. The memory stores instructions that, when executed by the processor, cause the processor to perform operations. The operations include obtaining from the cooktop temperature sensor assembly a plurality of samples of a temperature. The operations include projecting a future temperature based at least in part on the plurality of samples of the temperature. The operations include controlling the cooktop element based at least in part on the projected future temperature.

17 Claims, 6 Drawing Sheets

(56) References Cited

U.S. PATENT DOCUMENTS

| | | | | |
|---|---|---|---|---|
| 2,764,663 A | * | 9/1956 | Molyneaux | F24C 15/106 219/448.14 |
| 2,764,665 A | * | 9/1956 | Walkoe | F24C 15/102 219/416 |
| 2,806,122 A | * | 9/1957 | Thunander | G05D 23/1913 219/448.14 |
| 2,813,962 A | * | 11/1957 | Skala | F24C 15/105 219/448.14 |
| 2,879,368 A | * | 3/1959 | Strickland | G05D 23/24 219/448.14 |
| 2,891,125 A | * | 6/1959 | Miller | H01H 37/22 126/214 A |
| 2,919,337 A | * | 12/1959 | Brosseau | G05D 23/2754 219/448.13 |
| 3,246,122 A | * | 4/1966 | Wetzel | F24C 15/105 219/441 |
| 3,546,025 A | * | 12/1970 | Fredrick | H01L 35/06 136/205 |
| 3,679,870 A | * | 7/1972 | Opp | F24C 15/104 219/446.1 |
| 3,714,539 A | * | 1/1973 | Hampl, Jr. | F25B 21/02 136/205 |
| 4,019,974 A | * | 4/1977 | Weyl | G01N 27/4062 204/428 |
| 4,219,399 A | * | 8/1980 | Gruner | G01N 27/4067 204/408 |
| 4,241,289 A | * | 12/1980 | Bowling | F24C 15/105 136/221 |
| 4,272,941 A | * | 6/1981 | Hasselbacher | E06B 3/26307 49/DIG. 1 |
| 4,454,370 A | * | 6/1984 | Voznick | G01K 1/08 136/221 |
| 4,465,292 A | * | 8/1984 | Fry | B62D 7/20 280/124.11 |
| 4,493,980 A | * | 1/1985 | Payne | H05B 1/0266 219/448.12 |
| 4,493,981 A | * | 1/1985 | Payne | F24C 15/106 219/448.12 |
| 4,499,368 A | * | 2/1985 | Payne | F24C 3/126 219/432 |
| 4,518,010 A | * | 5/1985 | Mucheyer | B62D 5/062 137/543.13 |
| 4,639,578 A | * | 1/1987 | Payne | F24C 15/106 219/448.12 |
| 4,692,596 A | * | 9/1987 | Payne | F24C 15/106 219/448.12 |
| 4,700,884 A | * | 10/1987 | Barrett | E03B 7/04 126/362.1 |
| 4,714,822 A | * | 12/1987 | Braun | H05B 1/0266 219/448.12 |
| 4,788,398 A | * | 11/1988 | Hornung | F24C 15/106 219/448.12 |
| 4,842,273 A | * | 6/1989 | Schmeiss | A63B 21/05 482/126 |
| 4,859,081 A | * | 8/1989 | Kabayashi | G01K 1/16 136/221 |
| 5,197,670 A | * | 3/1993 | Hanson | B60H 1/00014 165/257 |
| 5,294,779 A | * | 3/1994 | Miquelot | H05B 3/70 219/447.1 |
| 5,315,240 A | * | 5/1994 | Jones | G01R 31/2874 219/444.1 |
| 5,416,469 A | * | 5/1995 | Colling | A61B 5/202 128/885 |
| 5,618,109 A | * | 4/1997 | Culbertson | G01K 7/04 136/201 |
| 5,638,418 A | * | 6/1997 | Douglass | G01K 1/028 374/102 |
| 5,727,954 A | * | 3/1998 | Kato | H01R 13/2421 439/66 |
| 5,801,940 A | * | 9/1998 | Russ | G01D 4/004 700/276 |
| 5,900,174 A | * | 5/1999 | Scott | H05B 3/746 219/447.1 |
| 5,945,017 A | * | 8/1999 | Cheng | F23D 14/76 219/446.1 |
| 5,947,370 A | * | 9/1999 | Rona | F23N 1/022 236/20 A |
| 6,080,942 A | * | 6/2000 | Sasaki | H01H 25/065 200/17 R |
| 6,111,231 A | * | 8/2000 | Corson | H05B 1/0266 219/412 |
| 6,257,758 B1 | * | 7/2001 | Culbertson | G01K 1/143 374/120 |
| 6,301,521 B1 | * | 10/2001 | Chen | A47J 27/62 374/16 |
| 6,392,431 B1 | * | 5/2002 | Jones | G01K 1/026 324/750.09 |
| 6,403,932 B1 | * | 6/2002 | Nelson | H05B 3/746 219/448.11 |
| 6,405,639 B1 | * | 6/2002 | Lee | A47J 27/14 126/25 R |
| 6,410,892 B1 | * | 6/2002 | Peschl | F24C 15/102 126/218 |
| 6,447,343 B1 | * | 9/2002 | Zhang | H01R 13/2421 439/289 |
| 6,462,316 B1 | * | 10/2002 | Berkcan | H05B 3/746 219/447.1 |
| 6,464,393 B2 | * | 10/2002 | Tatoh | G01K 1/143 136/233 |
| 6,489,551 B2 | * | 12/2002 | Chu | H01L 23/38 136/230 |
| 6,492,627 B1 | * | 12/2002 | Ensinger | H05B 3/746 219/447.1 |
| 6,663,439 B2 | * | 12/2003 | Henry | H01R 13/2421 439/700 |
| 6,670,567 B1 | * | 12/2003 | Koseki | H01H 19/005 200/17 R |
| 6,716,043 B2 | * | 4/2004 | Ishizuka | H01R 13/2421 439/131 |
| 6,753,509 B2 | * | 6/2004 | Gratz | H05B 3/746 219/448.11 |
| 6,761,666 B2 | * | 7/2004 | Chou | A63B 22/0056 482/52 |
| 6,796,711 B2 | * | 9/2004 | Colson | G01K 1/143 136/233 |
| 6,814,626 B2 | * | 11/2004 | Wen-Yao | H01R 13/2421 439/515 |
| 6,821,131 B2 | * | 11/2004 | Suzuki | H01R 13/2421 439/700 |
| 6,887,096 B2 | * | 5/2005 | Matumoto | H01R 13/2421 439/489 |
| 6,935,906 B2 | * | 8/2005 | Orihara | H01R 13/2421 439/289 |
| 6,951,489 B2 | * | 10/2005 | Sekiguchi | H01R 13/2421 439/700 |
| 7,021,976 B2 | * | 4/2006 | Sekiguchi | H01R 13/2421 439/824 |
| 7,094,112 B2 | * | 8/2006 | Arai | H01R 13/187 439/482 |
| 7,134,878 B2 | * | 11/2006 | Zheng | H01R 13/2421 439/515 |
| 7,201,613 B2 | * | 4/2007 | Sasaki | H01R 13/2421 439/700 |
| 7,285,026 B1 | * | 10/2007 | Ju | H01R 13/2421 439/700 |
| 7,307,246 B2 | * | 12/2007 | Smolenski | G01K 1/14 219/446.1 |
| 7,318,004 B2 | * | 1/2008 | Butterfield | G01K 7/42 374/102 |
| 7,337,674 B2 | * | 3/2008 | Burbank | A61M 1/3639 73/714 |
| 7,404,717 B2 | * | 7/2008 | Kazama | H01R 13/2421 439/66 |
| 7,479,613 B2 | * | 1/2009 | Zann | B60Q 1/1469 200/553 |
| 7,507,019 B2 | * | 3/2009 | Price | G01J 5/16 374/1 |

(56) References Cited

U.S. PATENT DOCUMENTS

| | | | | |
|---|---|---|---|---|
| 7,543,983 B2* | 6/2009 | Wu | | G01K 1/143 374/141 |
| 7,573,003 B2* | 8/2009 | Gratz | | H05B 3/746 219/448.11 |
| 7,573,005 B2* | 8/2009 | Clothier | | H05B 3/746 219/412 |
| 7,651,269 B2* | 1/2010 | Comendant | | G01K 1/143 374/141 |
| 7,690,925 B2* | 4/2010 | Goodman | | H01R 13/2421 361/813 |
| 7,909,509 B2* | 3/2011 | Mau | | G01K 1/143 324/500 |
| 7,922,529 B1* | 4/2011 | Meurer | | H01R 13/2421 439/248 |
| 7,968,824 B2* | 6/2011 | Lee | | F24C 15/105 219/447.1 |
| 8,083,402 B2* | 12/2011 | Mau | | G01J 5/04 374/109 |
| 8,162,539 B2* | 4/2012 | Mau | | B60H 1/00792 374/170 |
| 8,191,792 B2* | 6/2012 | Bandoh | | G01K 1/143 236/1 C |
| 8,702,303 B2* | 4/2014 | Farago | | G01K 1/026 374/141 |
| 8,915,453 B1* | 12/2014 | Sherry | | B05B 1/308 141/116 |
| 9,088,083 B2* | 7/2015 | Mason | | H05K 7/1069 |
| 2002/0052562 A1* | 5/2002 | Lipman | | A61B 5/4824 600/557 |
| 2002/0113051 A1* | 8/2002 | Willkens | | F23Q 7/22 219/270 |
| 2003/0163225 A1* | 8/2003 | Hanson | | G05D 23/1902 700/299 |
| 2003/0225543 A1* | 12/2003 | McIntosh | | G01J 5/60 702/134 |
| 2004/0056321 A1* | 3/2004 | Parsons | | G01F 1/692 257/417 |
| 2004/0077225 A1* | 4/2004 | Chun-Fu | | H01R 13/2471 439/700 |
| 2004/0238653 A1* | 12/2004 | Alles | | F24F 3/0442 236/49.3 |
| 2004/0239511 A1 | 12/2004 | Urban et al. | | |
| 2005/0120715 A1* | 6/2005 | Labrador | | F01K 27/00 60/618 |
| 2005/0194455 A1* | 9/2005 | Alles | | F24F 3/0442 236/1 B |
| 2005/0208443 A1* | 9/2005 | Bachinski | | F23D 14/84 431/8 |
| 2005/0286609 A1* | 12/2005 | Smolenski | | G01K 1/14 374/141 |
| 2006/0224349 A1* | 10/2006 | Butterfield | | G01K 7/42 702/130 |
| 2006/0231546 A1* | 10/2006 | Reithofer | | D06M 15/3562 219/448.19 |
| 2007/0000333 A1* | 1/2007 | Brugger | | A61M 1/3639 73/714 |
| 2007/0230126 A1* | 10/2007 | Pautsch | | H01L 23/4735 361/699 |
| 2009/0211986 A1* | 8/2009 | Kates | | E04H 4/129 210/742 |
| 2009/0242546 A1 | 10/2009 | Yungbluth et al. | | |
| 2013/0003782 A1* | 1/2013 | Farago | | G01K 1/026 374/184 |
| 2013/0186881 A1* | 7/2013 | Nakayama | | F24C 7/06 219/494 |
| 2013/0237076 A1* | 9/2013 | Mason | | H05K 7/1069 439/137 |

* cited by examiner

COOKTOP TEMPERATURE SENSORS AND METHODS OF OPERATION

FIELD OF THE INVENTION

The present disclosure relates generally to cooktop temperature sensors and methods of operation. In particular, the present disclosure relates to cooktop temperature sensor assemblies that include a resistance temperature detector electrically connected to at least two of three springs included in the assembly. Further, the present disclosure relates to a method for operating a cooktop in which collected temperature data is extrapolated to identify and analyze future cooktop temperatures.

BACKGROUND OF THE INVENTION

Appliances that include a cooktop such as coil cooktops or gas cooktops transfer a significant amount of energy to heat a cooking vessel such as a pan or pot and its contents.

A major concern regarding cooktops is the potential for a fire. In particular, the continuous or semi-continuous application of energy to the vessel can cause the vessel and/or its contents to ignite or otherwise catch fire.

For example, one of the most common causes of a cooktop fire is for the temperature of an inside surface of a cooking vessel to exceed ignition temperatures associated with one or more oils or other lipids in the cooking vessel. Another common cause of cooktop fires results from an increase in vessel temperature when liquids in the vessel are completely evaporated, a condition referred to as "boil-dry." Therefore, liquids are no longer present in the vessel to moderate temperature and other materials may be heated to an ignition temperature.

In addition, due to the presence of accelerants, operator inattention, or other factors, a kitchen fire can quickly expand beyond the control of the operator, causing major home damage and/or imperiling human life. As such, knowledge of the temperature of the cooking vessel would be helpful for preventing cooktop fires.

However, due to the non-identical shapes and sizes of cooking vessels, it is difficult for currently existing sensors to obtain an accurate reading of vessel temperature. For example, certain existing sensor assemblies may be unable to maintain sufficient contact with the cooking vessel as it is shifted about the cooktop or due to vessel shape anomalies such as embossed features, warping, or roughness.

Furthermore, certain existing cooktop control algorithms can fail to avoid or account for certain scenarios where ignition of oils or lipids is highly likely. In particular, most existing control algorithms focus on moderating cooktop/vessel temperature once the cooktop/vessel has reached a steady state (e.g. during the cooking period after initial heat up). However, these control algorithms can fail to provide proper moderation during the initial heat up and therefore may be susceptible to initial temperature overshoot, a common cause of cooktop fires.

As an example, certain existing controls rely upon the application of a current to a bi-metal strip which heats and cools to generate a duty cycle. While this control method may provide suitable control during steady state, it fails to address initial temperature overshoot, thereby rendering the cooktop susceptible to cooktop fires.

Therefore, cooktop temperature assemblies that can obtain an accurate temperature reading for the cooktop or vessel are desirable. Furthermore, cooktop control algorithms which reduce the potential for cooktop fires in both initial heat up and steady state are desirable.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a cooktop appliance. The cooktop appliance includes a cooktop element and a cooktop temperature sensor assembly. The cooktop temperature sensor assembly includes three springs providing support for a platform upon which a cooking vessel rests. The cooktop temperature sensor assembly includes a resistance temperature detector electrically connected to at least two of the three springs. The cooktop appliance includes a processor and a memory. The memory stores instructions that, when executed by the processor, cause the processor to perform operations. The operations include obtaining from the cooktop temperature sensor assembly a plurality of samples of a temperature. The operations include projecting a future temperature based at least in part on the plurality of samples of the temperature. The operations include controlling the cooktop element based at least in part on the projected future temperature.

Another aspect of the present disclosure is directed to a cooktop temperature sensor assembly. The cooktop temperature sensor assembly includes a lower ceramic element and three springs respectively positioned within three cavities included in the lower ceramic element. The cooktop temperature sensor assembly includes an upper ceramic element. The upper ceramic element is secured to a top of each of the three springs. The cooktop temperature sensor assembly includes a resistance temperature detector. The resistance temperature detector is electrically connected to two of the three springs. The cooktop temperature sensor assembly includes a cap positioned on top of the upper ceramic element.

Another aspect of the present disclosure is directed to a method for operating a cooktop appliance. The method includes obtaining, by the appliance, a plurality of samples of a temperature associated with a cooktop element. The method includes performing, by the appliance, curve fitting to identify a linear estimate of a natural logarithm of the plurality of samples as a function of time. The method includes extrapolating, by the appliance, a future temperature at a predetermined amount of time into the future based on the linear estimate. The method includes determining, by the appliance, whether to de-energize the cooktop element based at least in part on the extrapolated future temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
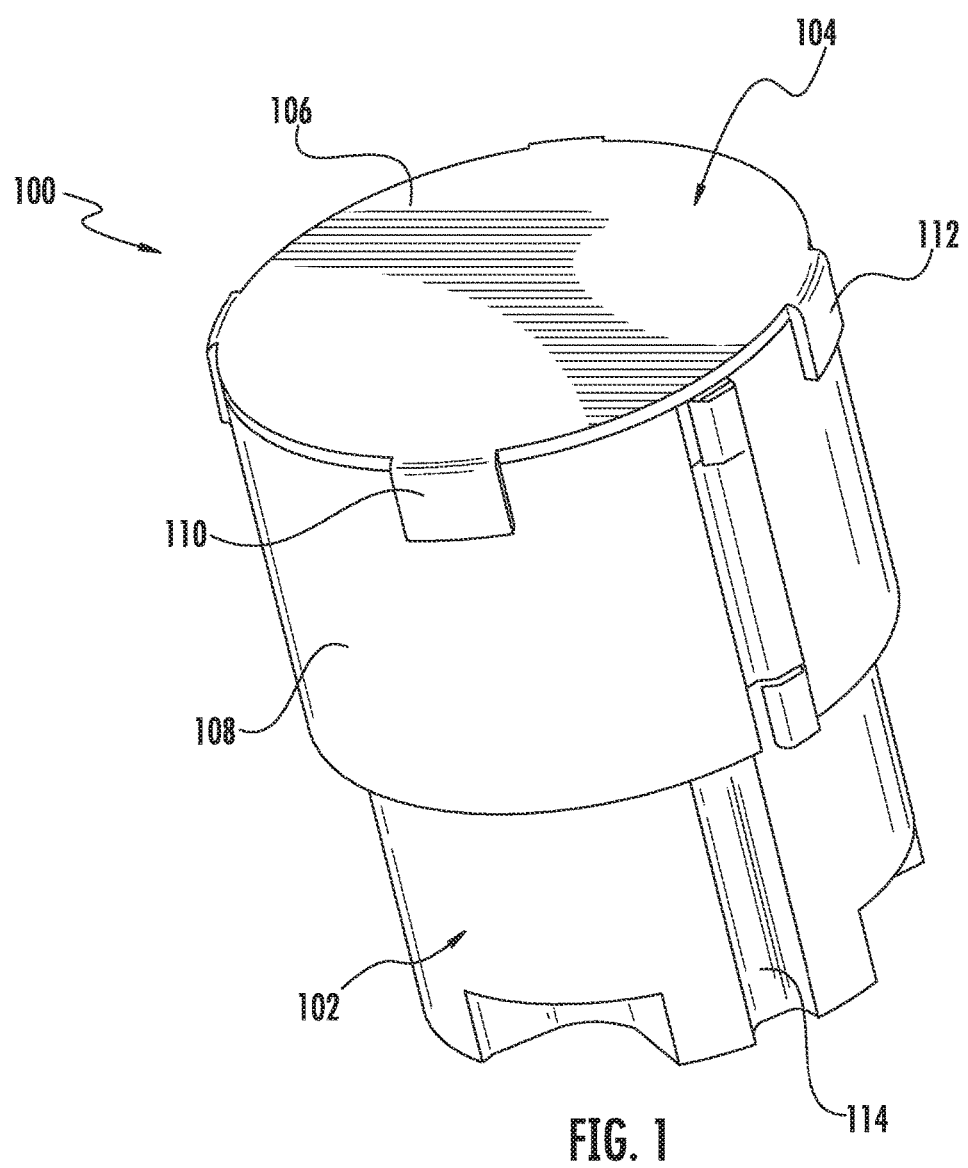
FIG. 1 depicts an example cooktop temperature sensor assembly according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With reference now to the FIGS., example embodiments of the present disclosure will be discussed in further detail. FIG. 1 depicts an example cooktop temperature sensor assembly 100 according to an example embodiment of the present disclosure.

Cooktop temperature sensor assembly 100 can include a lower ceramic element 102 and a cap 104. Cap 104 can include a plate 106 secured to a tube 108. For example, plate 106 can include a plurality of tabs (e.g. tabs 110 and 112) that secure plate 106 to tube 108. Cap 104 can be formed from a metallic material (e.g. steel).

Lower ceramic element 102 and cap 104 can be generally cylindrical, as shown in FIG. 1. However, other cross-sectional shapes can be utilized as well, such as, for example, elliptical, square, rectangular, abstract, or other shapes.

Cap 104 can slide vertically with respect to lower ceramic element 102. For example, lower ceramic element 102 can include a plurality of guide rails (e.g. guide rail 114). Tube 108 can include a plurality of guide tabs (not shown) that respectively slide along the plurality of guide rails.

Thus, cap 104 can serve as a platform for a cooking vessel. In particular, as will be discussed further with respect to FIG. 2, cap 104 can be supported by a plurality of springs. As such, when a cooking vessel is placed upon cap 104, the springs can compress and cap 104 can be guided downwards by the plurality of guide rails. However, the spring forces will ensure that cap 104 retains contact with the cooking vessel. In such fashion, a temperature sensor included in sensor assembly 100 can accurately gauge the temperature at the cooking vessel.

Figure 2:
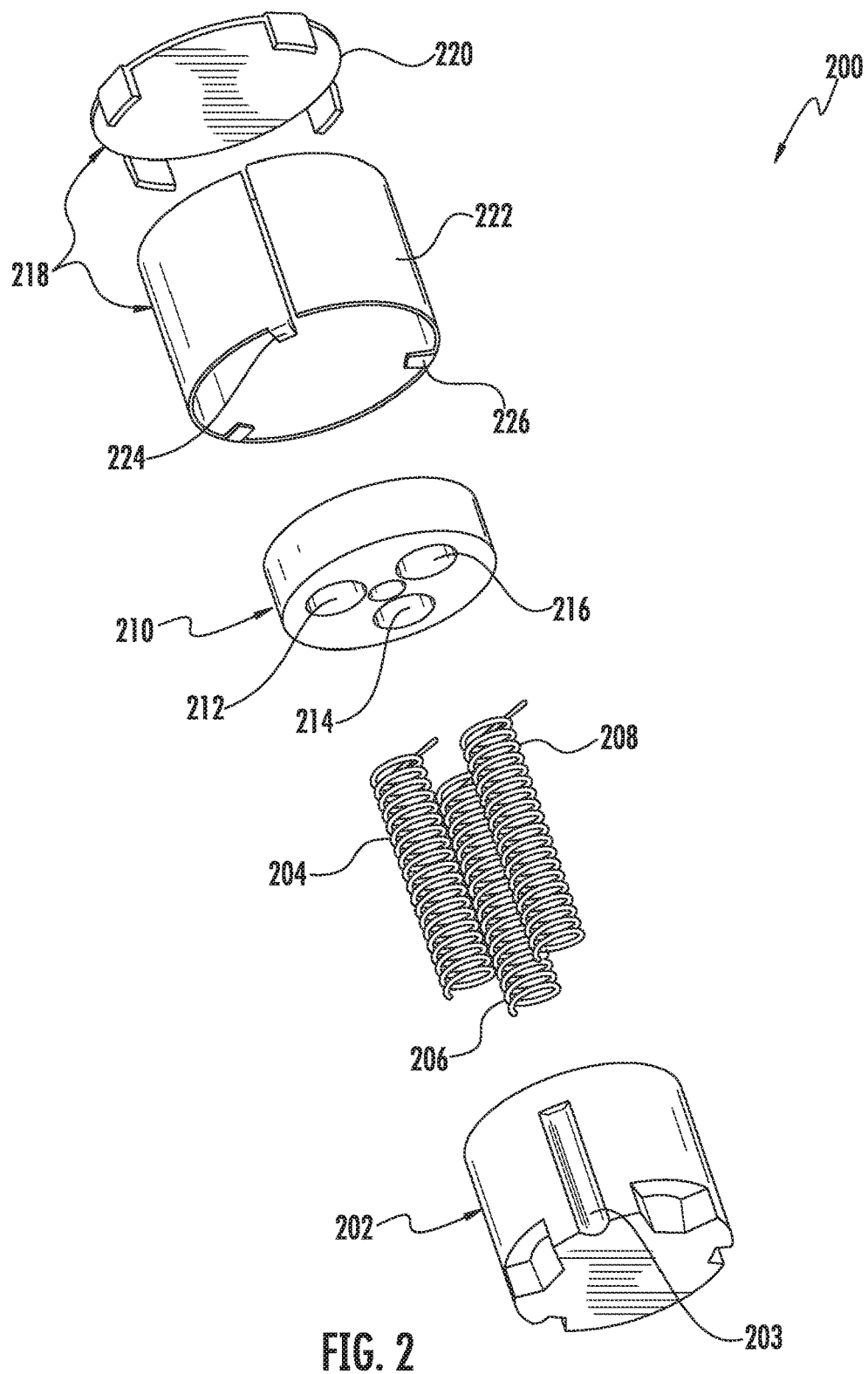
FIG. 2 depicts an exploded view of an example cooktop temperature sensor assembly according to an example embodiment of the present disclosure.

FIG. 2 depicts an exploded view of an example cooktop temperature sensor assembly 200 according to an example embodiment of the present disclosure. Cooktop temperature sensor assembly 200 can include a lower ceramic element 202; three springs 204, 206, and 208; an upper ceramic element 210; and a cap 218.

Lower ceramic element 202 can have three cavities (not shown) into which springs 204-208 can be respectively positioned and secured. For example, the three cavities of lower ceramic element 202 can have a triangular arrangement that mirrors the arrangement of cavities 212, 214, and 216 of upper ceramic element 210. The cavities of lower ceramic element 202 can be generally cylindrical and can have any suitable diameter. However, other cross-sectional shapes may be used as well.

The springs 204-208 can be secured to lower ceramic element 202 using force fitting, welding, adhesive, screws, brackets, or other forms of securement. In other implementations, the springs 204-208 can be held in place by tension caused by the spatial arrangement of cap 218 and lower ceramic element 202.

Springs 204, 206, and 208 can each be coil springs. However, other types of springs can be used. Generally, springs 204-208 can be formed from a material suitable for high temperature applications. For example, springs 204-208 can each be formed from an Inconel® alloy, such as, for example, Inconel® X-750.

Springs 204, 206, and 208 can be coupled to and provide support for upper ceramic element 210. For example, springs 204-208 can respectively extend into and/or through cavities 212, 214, and 216.

The springs 204-208 can be coupled to upper ceramic element 210 using force fitting, welding, adhesive, screws, brackets, or other forms of securement. As another example, in some embodiments, the springs 204-208 can be embedded into upper ceramic element 210.

Cap 218 can include a plate 220 and a tube 222. Plate 220 can be secured to tube 222 and close the upper end of tube 222. In some embodiments, tube 222 can be a rolled sheet of metal.

The cap 218 can generally surround the upper ceramic element 210. For example, cap 218 can rest upon the top of upper ceramic element 210. In particular, in some implementations, the bottom side of plate 220 can rest upon the top of upper ceramic element 210.

Thus, the cap 218 and/or upper ceramic element 210 can serve as a platform upon which a cooking vessel may be placed. Further, the triangular arrangement of springs 204-208 shown in FIG. 2 can serve to allow the cap 218 to retain substantial contact with the cooking vessel regardless of cooking vessel orientation or shape abnormalities (e.g. embossed features, roughness, warp, etc.). In particular, the triangular arrangement of the springs 204-208 can provide gimbal action for the cap 218.

Furthermore, in some embodiments, the cap 218 can include one or more securements (not shown) which hold cap 218 in place with respect to upper ceramic element 210. For example, one or more securements may be included internally within tube 222 and secure cap 218 to upper ceramic element 210.

Cap 218 can include a plurality of guide tabs at a lower end of tube 222 (e.g. guide tabs 224 and 226). Each of the plurality of guide tabs can fit into a corresponding guide rail included in lower ceramic element 202.

As an example, guide tab 224 can slide vertically along guide rail 203, such that the vertical movement of cap 218 with respect to lower ceramic element is controlled. In some implementations, the guide tabs do not completely fill the negative space of the guide rails, such that an amount of non-vertical motion of cap 218 is permitted.

According to an aspect of the present disclosure, temperature sensor assembly 200 can further include a resistance temperature detector (not shown). For example, the resistance temperature detector can be a platinum resistance temperature detector.

The resistance temperature detector can be positioned such that it is able to serve as a temperature sensor to detect a temperature associated with a cooking vessel in contact with cap 218. For example, the resistance temperature detector can be thermodynamically coupled to cap 218.

As an example, the resistance temperature detector can be positioned between the upper ceramic element 210 and the cap 218. For example, the resistance temperature detector may rest upon a top surface of upper ceramic element 210.

As another example, the resistance temperature detector may be positioned in a depression or other accommodation in the top surface of upper ceramic element 210. In some implementations, the resistance temperature detector can be in physical contact with the plate 210 or the tube 222.

The resistance temperature detector can be electrically connected to at least two of springs 204, 206, and 208. For example, the legs of the resistance temperature detector can be welded to the springs.

A sensing current can be provided through a first spring, across a resistor included in the resistance temperature detector, and then back through a second spring. The sensing current can be used to read the resistance of the resistance temperature detector at any point in time and, therefore, be used to obtain a sample of the temperature associated with the resistance temperature detector.

Lower ceramic element 202 can house or otherwise be accompanied by a wiring harness that secures respective electrical connections between at least two conductors (e.g. wires) and at least two of the springs 204-208.

The wiring harness can be electrically connected to a controller or other processing system of the appliance and can include any suitable hardware or circuitry for measuring the resistance provided by the resistance temperature detector at any point in time.

Figure 3:
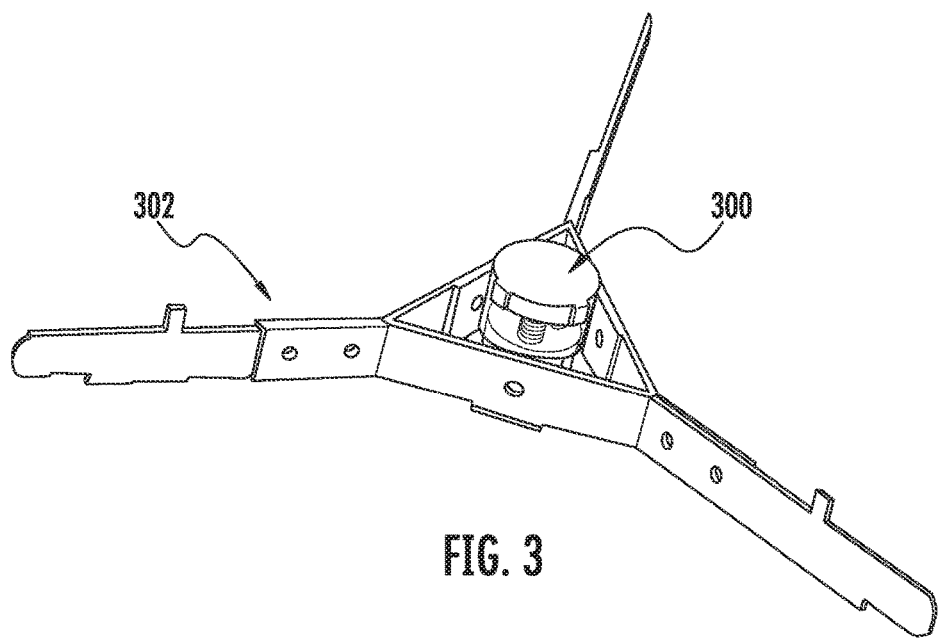
FIG. 3 depicts an example cooktop temperature sensor assembly according to an example embodiment of the present disclosure.

FIG. 3 depicts an example cooktop temperature sensor assembly 300 according to an example embodiment of the present disclosure. In particular, FIG. 3 shows the cooktop temperature sensor assembly 300 mounted in a mounting assembly 302.

Mounting assembly 302 can hold or provide support for a cooktop element (not shown). For example, the cooktop element can be a coil cooktop element (e.g. a coil Calrod electric heating element). As another example, the cooktop element can be a gas cooktop burner and associated cooking vessel supports.

The cooktop element can have a central cavity through which the temperature sensor assembly extends. For example, in the instance that the cooktop element is a coil cooktop element, the coil cooktop element can have a plurality of turns of the coil that leave a central cavity. Alternatively, the temperature sensor assembly can be located at a non-central location or otherwise not be positioned within a cavity created by the cooktop element.

As an example, in some implementations, the cooktop temperature sensor assembly 300 can extend a first distance vertically past the cooktop element when the three springs are in an uncompressed position. For example, the first distance can be about one eighth of an inch.

Thus, when a cooking vessel is placed on the temperature sensor assembly 300, the springs can compress to the point that the cooking vessel rests upon the cooking element or other associated vessel supports. However, the return forces provided by the springs will ensure that the temperature sensor assembly 300 retains sufficient contact with the cooking vessel.

Figure 4:
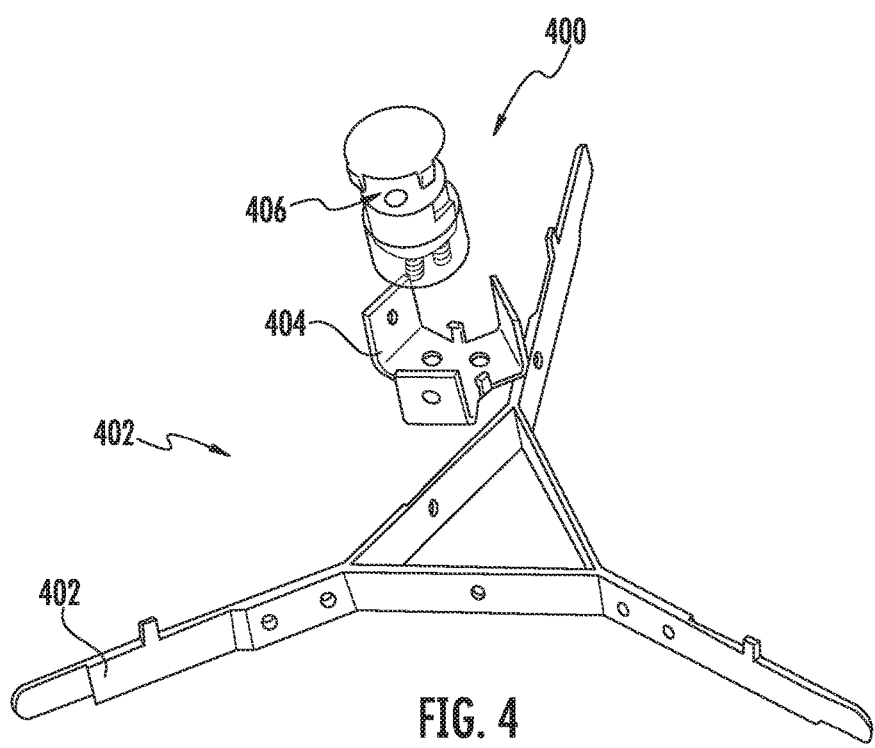
FIG. 4 depicts an exploded view of an example cooktop temperature sensor assembly according to an example embodiment of the present disclosure.

FIG. 4 depicts an exploded view of an example cooktop temperature sensor assembly 400 according to an example embodiment of the present disclosure. Further, FIG. 4 depicts an exploded view of an example mounting assembly 402. Mounting assembly 402 can include a support 402 and a mounting bracket 404.

Also shown in FIG. 4 is a location 406 at which a resistance temperature detector can be positioned. However, the resistance temperature detector can be positioned in other locations as well.

Figure 5A:
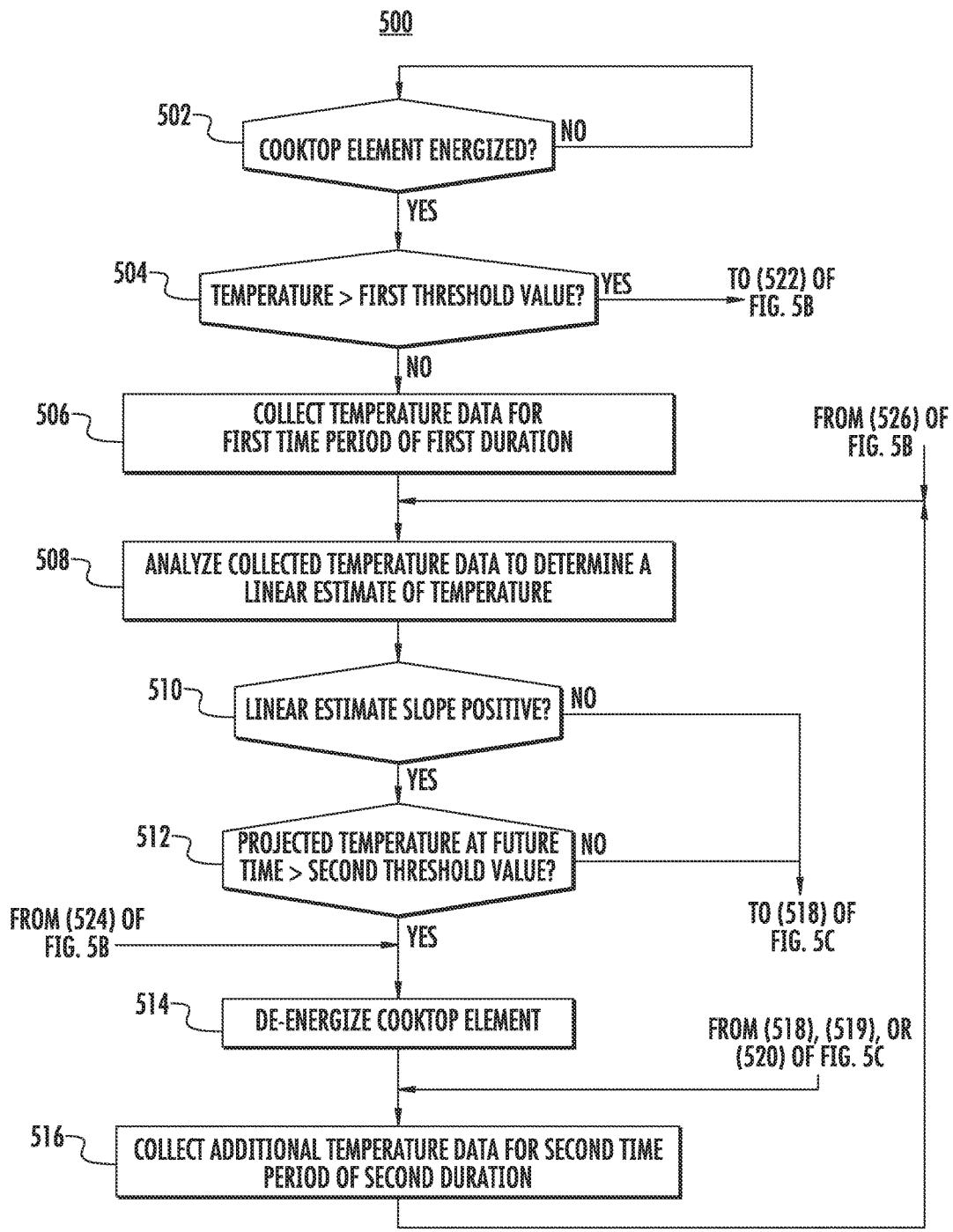
FIGS. 5A-5C depict a flow chart of an example method of operating a cooktop appliance according to an example embodiment of the present disclosure.
Figure 5B:
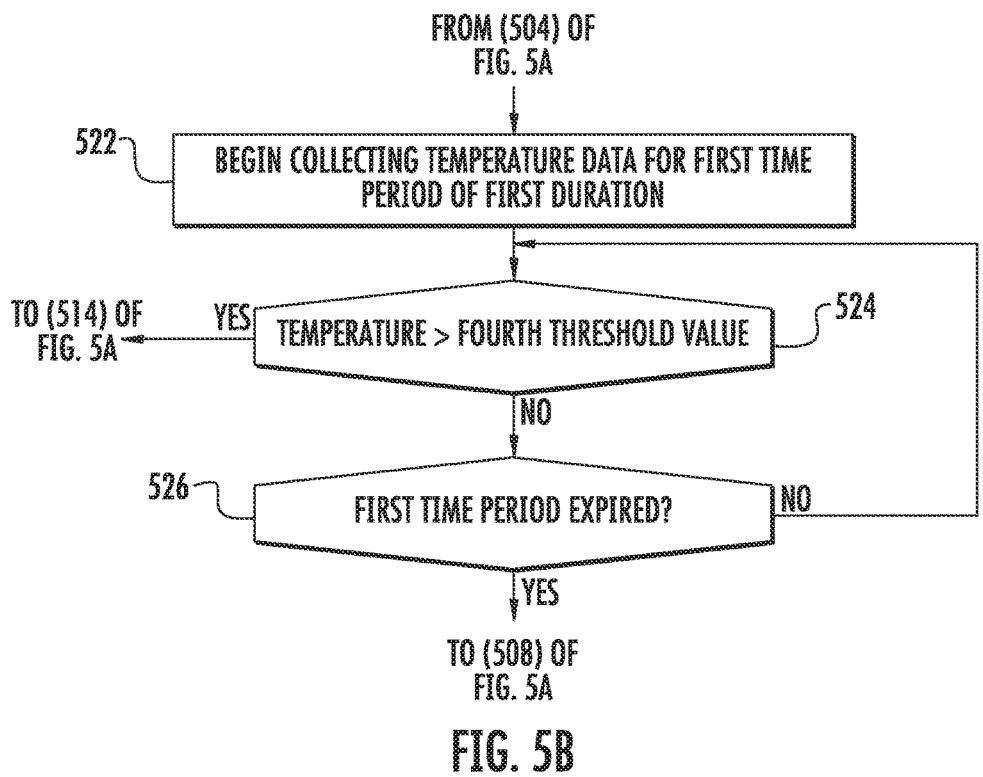
Figure 5C:
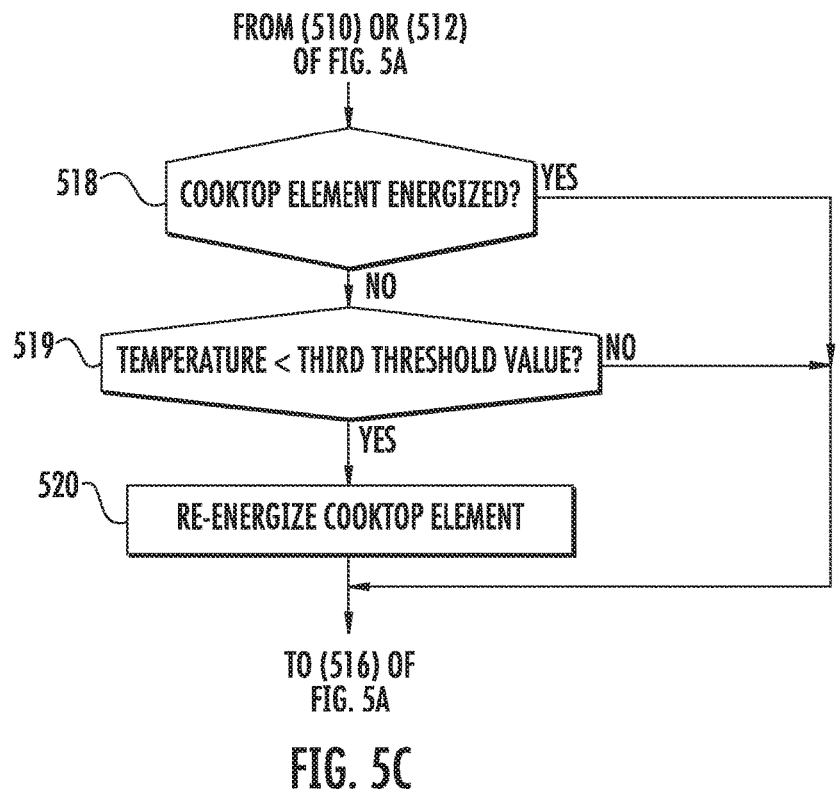

FIGS. 5A-5C depict a flow chart of an example method (500) of operating a cooktop appliance according to an example embodiment of the present disclosure. Method (500) can be performed by any suitable appliance system.

In addition, FIGS. 5A-5C depict steps performed in a particular order for purposes of illustration and discussion. Those of ordinary skill in the art, using the disclosures provided herein, will understand that the various steps of method (500) can be omitted, adapted, and/or rearranged in various ways without departing from the scope of the present disclosure.

At (502) it can be determined whether a cooktop element of the appliance is energized. For example, the cooktop element can be a coil electric heating element or a gas burner. Thus, at (502) it can be determined whether energy (e.g. electrical current or the flow of gas) is currently being provided to the cooktop element.

If it is determined at (502) that the cooktop element is not energized, then method (500) can return again to (502) and continue waiting for the cooktop element to be energized.

However, if it is determined at (502) that the cooktop element is energized, then method (500) can proceed to (504).

At (504) it can be determined whether a temperature associated with the cooktop element is greater than a first threshold value. As an example, the first threshold value can be a temperature at about a typical room temperature. For example, the first threshold value can be about thirty to forty degrees Celsius.

If it is determined at (504) that the temperature is greater than the first threshold value, then method (500) can proceed to (522) of FIG. 5B, as will be discussed further later. Thus, upon initialization of the cooktop element, it can be determined if temperatures at the cooktop element already exceed a room temperature (e.g. due to a recent previous usage).

If the temperature is already elevated past room temperature upon initialization, then extra measures can be taken ensure avoidance of cooktop fires. As such, method (500) provides enhanced protection against cooktop fires arising from an initial temperature overshoot, as will be discussed further with reference to FIG. 5B.

However, if it is determined at (504) that the temperature is not greater than the first threshold value, then method (500) can proceed to (506).

At (506) temperature data can be collected for a first period having a first duration. As an example, the first period can have a duration of about sixty seconds. For example, a sample can be taken from a temperature sensor assembly measuring temperature at the cooktop element every five seconds over the sixty second period. However, other sampling rates and period durations can be used as well (e.g. one sample per second). After the collection period, method (500) can proceed to (508).

At (508) the collected temperature data can be analyzed to determine a linear estimate of temperature. More particularly, according to an aspect of the present disclosure, determining the linear estimate at (508) can include performing curve fitting with respect to a natural logarithm of the plurality of samples collected at (506).

As an example, the curve fitting can be performed at (508) by first expressing the plurality of samples as a function of time. Next, a natural logarithm can be taken with respect to the plurality of samples expressed as the function of time. Then, using best fit curve fitting, a linear estimate can be determined with respect to the natural logarithm of the plurality of samples.

At (510) it can be determined whether a slope of the linear estimate determined at (508) is positive. If the slope of the linear estimate is positive, then the temperature can be assumed to continue increasing into the future.

If it is determined at (510) that the slope of the linear estimate is not positive then method (500) can proceed to (518) of FIG. 5C, as will be discussed further later.

However, if it is determined at (510) that the slope of the linear estimate is positive, then method (500) can proceed to (512).

At (512) it can be determined whether a projected temperature at a future time is greater than a second threshold value. As an example, at (512) a future temperature at a predetermined point in the future can be projected based on the linear estimate determined at (508). For example, the future temperature can be the temperature at one-thousand seconds into the future, as projected by or otherwise extrapolated from the linear estimate.

Furthermore, in some implementations, the second threshold value used at (512) can be a temperature associated with the ignition of one or more cooking oils or other lipids. For example, the second threshold value can be about four-hundred degrees Celsius.

If it is determined at (512) that the projected temperature at the future time is not greater than the second threshold value, then method (500) can proceed to (518) of FIG. 5C, as will be discussed further later.

However, if it is determined at (512) that the projected temperature at the future time is not greater than the second threshold value, then method (500) can proceed to (514).

At (514) the cooktop element can be de-energized. Thus, if the temperature is both rising (e.g. as indicated by the slope of the linear estimate) and projected to exceed the second threshold value, then the cooktop element can be de-energized so as to prevent conditions susceptible to the creation of a cooktop fire.

As an example, in the instance that the cooktop element is an electric heating element, de-energizing the cooktop element at (514) can include controlling a relay to electrically disconnect the heating element from line power. As another example, in the instance that the cooktop element is a gas burner, de-energizing the cooktop element at (514) can include controlling a valve or other component so as to attenuate or extinguish the flow of gas to the burner.

At (516) additional temperature data can be collected for a second time period having a second duration. As an example, the second time period can be about five seconds. However, any duration can be used.

After (516), method (500) can return to (508) and re-analyze the collected temperature data to determine a new linear estimate.

In particular, in some implementations, the linear estimate determined at (508) is determined with respect to only temperature samples collected within the most recent sixty seconds. Thus, the linear estimate can be determined with respect to a moving window of temperature data. In such fashion, the collected temperature data can be periodically analyzed for safety issues and acted upon.

Thus, after the additional data is collected and the new linear estimate is produced, the conditions of (510) and (512) can then be reapplied to the new linear estimate.

In particular, if it is determined that either of the conditions specified by (510) and (512) are not met, then method (500) can proceed to (518) of FIG. 5C.

Referring now to FIG. 5C, at (518) it can be determined whether the cooktop element is energized. If it is determined at (518) that the cooktop element is energized, then method (500) can proceed to (516) of FIG. 5A and continue collecting additional temperature data. Thus, if either of the conditions specified by (510) and (512) are not met and the cooktop element is energized, then method (500) can simply continue collecting temperature data. In such fashion, if the temperature data indicates that conditions are safe for normal operation, then method (500) will not interrupt cooktop element operation.

However, if it is determined at (518) that the cooktop element is not energized, then method (500) can proceed to (519).

At (519) it can be determined whether the temperature is less than a third threshold value. For example, the third threshold value can be about two-hundred degrees Celsius.

If is it determined at (519) that the temperature is not less than the third threshold value, then method (500) can proceed to (516) of FIG. 5A and continue collecting additional temperature data. Thus, if the cooktop element has been previously de-energized and the temperature has not yet fallen below the third threshold value, then de-energization of the cooktop element can be maintained for an additional second time period at (516).

However, if it is determined at (519) that the temperature is less than the third threshold value, then method (500) can proceed to (520). At (520) the cooktop element can be re-energized. Thus, if the temperature has fallen below the third threshold value, then it can be assumed that it is safe to resume energization of the cooktop element.

As an example, re-energizing the cooktop element at (520) can include controlling a relay to reconnect the cooktop element to a power source. As another example, re-energizing the cooktop element at (520) can include controlling a valve or other component to allow the normal flow of gas to a gas burner.

After (520) method (500) can proceed to (516) of FIG. 5A and continue collecting additional temperature data. In such fashion, the collected temperature data can be periodically analyzed for safety issues and acted upon.

Returning to discuss (504) of FIG. 5A, if it is determined upon cooktop element initialization that the temperature is greater than the first threshold value, then method (500) can proceed to (522) of FIG. 5B.

Referring now to FIG. 5B, at (522) temperature data can begin being collected for the first time period having the first duration.

At (524) it can be determined whether the temperature is greater than a fourth threshold value. For example, the fourth threshold value can be about two-hundred degrees Celsius.

If it is determined at (524) that the temperature is greater than the third threshold value, then method (500) can proceed to (514) of FIG. 5A and de-energize the cooktop element. Thus, if the temperature is already elevated past the first threshold value upon cooktop element initialization, the temperature can be monitored during the first period of temperature data collection. If during such period the temperature exceeds the fourth threshold value, then the cooktop element can be de-energized. In such fashion, method (500) can protect against cooktop fires that result from initial temperature overshoot.

However, if it is determined at (524) of FIG. 5B that the temperature is not greater than the fourth threshold value, then method (500) can proceed to (526).

At (526) it can be determined whether the first time period has expired. If it is determined at (526) that the first time period has not yet expired, then method (500) can return to (524) and again monitor the temperature.

However, if is determined at (526) that the first time period has expired, then method (500) can proceed to (508) of FIG. 5A.

Figure 6:
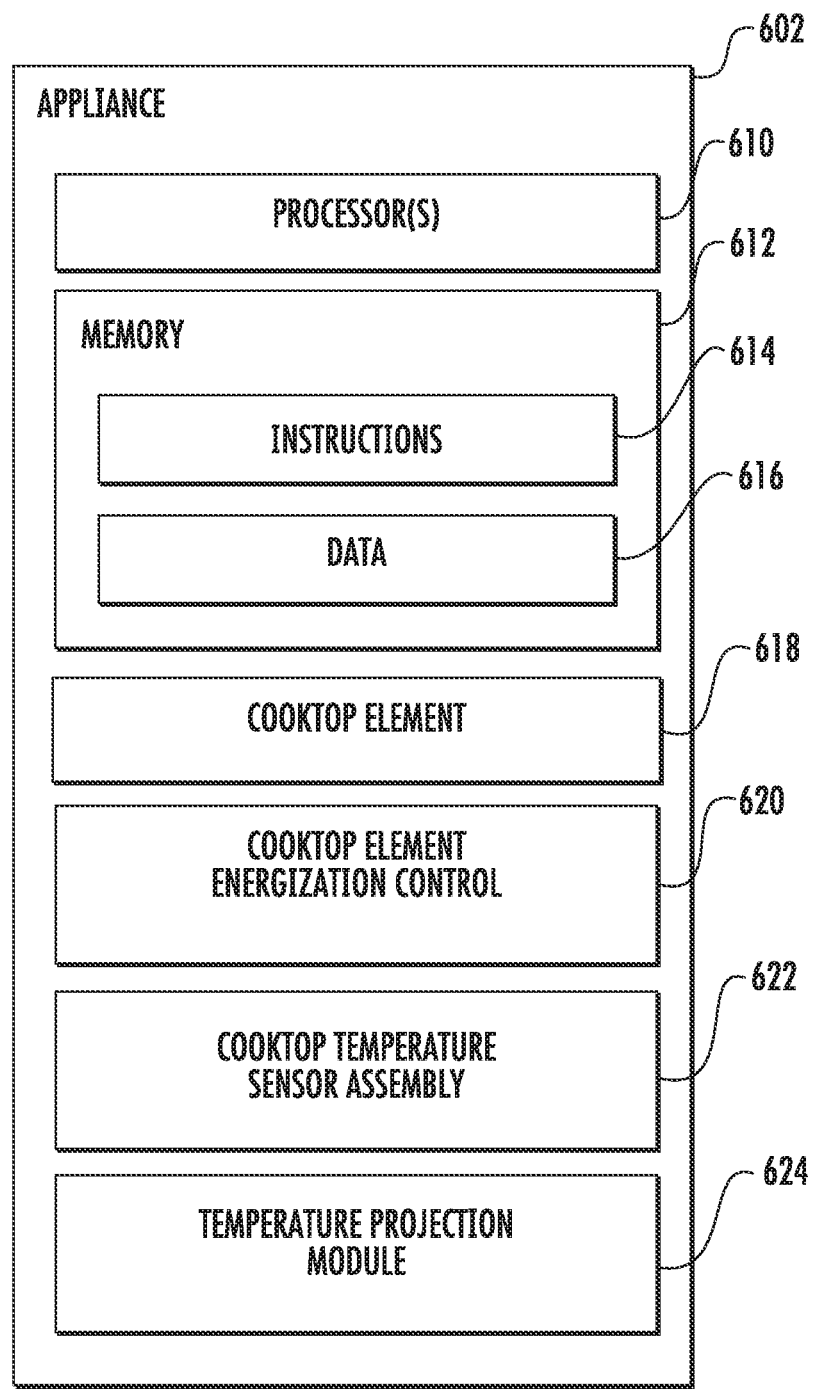
FIG. 6 depicts a block diagram of an example cooktop appliance according to an example embodiment of the present disclosure.

FIG. 6 depicts a block diagram of an example cooktop appliance 602 according to an example embodiment of the present disclosure.

Appliance 602 can include one or more processors 610 and a memory 612. The processor(s) 610 can be any suitable processing device, such as a microprocessor, microcontroller, integrated circuit, or other suitable processing device.

The memory 612 can include any suitable storage media, including, but not limited to, non-transitory computer-readable media, RAM, ROM, hard drives, flash drives, accessible databases, or other memory devices. The memory 612 can store information accessible by processor(s) 610, including instructions 614 that can be executed by processor(s) 610 to control various components of appliance 602 to provide appliance functionality. Memory 612 can also store various forms of other data 616.

Appliance 602 can also include a cooktop element 618. For example, the cooktop element 618 can be a coil cooktop element (e.g. a coil Calrod electric heating element). As another example, the cooktop element 618 can be a gas cooktop burner and associated cooking vessel supports. Other cooktop elements using other forms of energization can be implemented as well.

Appliance 602 can include a cooktop element energization control 620. Energization control 620 can be any suitable device or component for controlling the flow of energy from an energy source to the cooktop element 618. For example, in the instance that cooktop element 618 is electrically powered, energization control 620 can be a relay, switching element, or other circuitry for controlling the flow of power from a power source to the cooktop element. As another example, in the instance that cooktop element 618 is a gas burner, the energization control 620 can be a valve or other component for controlling the flow of gas.

Appliance 602 can also include a cooktop temperature sensor assembly 622. Temperature sensor assembly 622 can be any device or assembly of components that obtains a temperature associated with the cooktop element 618. For example, temperature sensor assembly 622 can be cooktop temperature assembly 200 of FIG. 2.

Appliance 602 can include a temperature projection module 624. Temperature projection module 624 can project or otherwise extrapolate one or more future temperatures based upon temperature data collected by cooktop temperature sensor assembly 622.

As an example, in some implementations, temperature projection module 624 can perform curve fitting with respect to a natural logarithm of a plurality of temperature samples collected by cooktop temperature sensor assembly 622.

For example, the temperature projection module 624 can perform curve fitting by first expressing the plurality of samples as a function of time. Next, a natural logarithm can be taken with respect to the plurality of samples expressed as the function of time. Then, using best fit curve fitting, a linear estimate can be determined with respect to the natural logarithm of the plurality of samples.

It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance comprising:
   a cooktop element;
   a cooktop temperature sensor assembly comprising:
      a lower ceramic element comprising a plurality of guide rails, the lower ceramic element being generally cylindrical;
      three springs providing support for a platform upon which a cooking vessel rests, each spring of the three springs positioned within a cavity included in the lower ceramic element;
      an upper ceramic element secured to a top of each of the three springs, the upper ceramic element being generally cylindrical;
      a resistance temperature detector electrically connected to at least two of the three springs; and
      a cap positioned on top of the upper ceramic element, the cap comprising a circular plate closing an upper end of the tube and covering a top of the upper ceramic element, the cap further comprising a tube generally surrounding the upper ceramic element, the tube comprising a plurality of tabs located at a lower end of the tube, each tab of the plurality of tabs being slidable along the plurality of guide rails, a processor; and
   a memory;
   wherein the memory stores instructions that, when executed by the processor, cause the processor to perform operations, the operations comprising:
      obtaining from the cooktop temperature sensor assembly a plurality of samples of a temperature;
      projecting a future temperature based at least in part on the plurality of samples of the temperature; and
      controlling the cooktop element based at least in part on the projected future temperature.

2. The cooktop appliance of claim 1, wherein:
the three springs are arranged in a triangle so as to provide gimbal action to the platform; and
the resistance temperature detector is thermodynamically coupled to the platform.

3. The cooktop appliance of claim 1, wherein projecting the future temperature based at least in part on the plurality of samples of the temperature comprises:
taking a natural logarithm of the plurality of samples as a function of time;
performing curve fitting to identify a linear estimate of the natural logarithm of the plurality of samples as a function of time; and
projecting the future temperature based at least in part on the linear estimate.

4. A cooktop temperature sensor assembly, comprising:
a lower ceramic element comprising a plurality of guide rails;
three springs respectively positioned within three cavities included in the lower ceramic element;
an upper ceramic element, wherein the upper ceramic element is secured to a top of each of the three springs;
a resistance temperature detector, wherein the resistance temperature detector is electrically connected to two of the three springs; and
a cap positioned on top of the upper ceramic element, the cap comprising a circular plate closing an upper end of the tube and covering a top of the upper ceramic element, the cap further comprising a tube generally surrounding the upper ceramic element, the tube comprising a plurality of tabs located at a lower end of the tube, each tab of the of the plurality of tabs being slidable along the plurality of guide rails,
wherein the lower ceramic element and the upper ceramic element are generally cylindrical.

5. The cooktop temperature sensor assembly of claim 4, wherein the three springs are positioned in a triangular arrangement.

6. The cooktop temperature sensor assembly of claim 4, wherein the three springs pass into three cavities included in the upper ceramic element.

7. The cooktop temperature sensor assembly of claim 4, wherein the resistance temperature detector rests upon a top of the upper ceramic element.

8. The cooktop temperature sensor assembly of claim 4, wherein the resistance temperature detector is in physical contact with the cap when a cooking vessel is placed on the cooktop temperature assembly.

9. The cooktop temperature sensor of claim 4, wherein:
the plurality of guide rails comprise vertical indentations into the lower ceramic element;
a portion of the lower ceramic element along which the plurality of guide rails extend vertically does not reach a top of the lower ceramic element, such that a range of motion of the cap is limited.

10. The cooktop temperature sensor assembly of claim 4, further comprising a wire harness electrically connected, at the lower ceramic element, to the two springs to which the resistance temperature detector is connected;
wherein the wire harness is configured to supply a sensing current across the resistance temperature detector via the two springs.

11. The cooktop temperature sensor assembly of claim 4, wherein:
the cooktop temperature sensor assembly is positioned in a center cavity formed by a cooktop element; and
the cooktop temperature sensor assembly extends a first distance upwards past the cooktop element when the three springs are in an uncompressed position.

12. A method for operating a cooktop appliance, the method comprising:
obtaining, by the appliance, a plurality of samples of a temperature associated with a cooktop element, wherein the plurality of samples are obtained from a cooktop temperature sensor assembly that is in contact with a cooking vessel;
performing, by the appliance, curve fitting to identify a linear estimate of a natural logarithm of the plurality of samples as a function of time;
extrapolating, by the appliance, a future temperature at a predetermined amount of time into the future based on the linear estimate; and
determining, by the appliance, whether to de-energize the cooktop element based at least in part on the extrapolated future temperature,
wherein the cooktop temperature assembly comprises:
a lower ceramic element comprising a plurality of guide rails, the lower ceramic element being generally cylindrical;
three springs providing support for a platform upon which the cooking vessel rests, each spring of the three springs positioned within a cavity included in the lower ceramic element;
an upper ceramic element secured to a top of each of the three springs, the upper ceramic element being generally cylindrical;
a resistance temperature detector electrically connected to at least two of the three springs; and
a cap positioned on top of the upper ceramic element, the cap comprising a circular plate closing an upper end of the tube and covering a top of the upper ceramic element, the cap further comprising a tube generally surrounding the upper ceramic element, the tube comprising a plurality of tabs located at a lower end of the tube, each tab of the plurality of tabs being slidable along the plurality of guide rails.

13. The method of claim 12, wherein performing curve fitting comprises:
expressing, by the appliance, the plurality of samples as a function of time;
taking, by the appliance, a natural logarithm of the plurality of samples as the function of time; and
curve fitting, by the appliance, a linear estimate to the natural logarithm of the plurality of samples as the function of time.

14. The method of claim 12, wherein determining, by the appliance, whether to de-energize the cooktop element based at least in part on the extrapolated future temperature comprises de-energizing, by the appliance, the cooktop element when a slope of the linear estimate is positive and the extrapolated future temperature exceeds a threshold value.

15. The method of claim 14, wherein the threshold value comprises an ignition temperature associated with one or more cooking oils.

16. The method of claim 12, wherein the steps of performing curve fitting and extrapolating the future temperature are performed periodically with respect to a moving window of the plurality of samples of the temperature associated with the cooktop element.

17. The method of claim 12, further comprising:
prior to obtaining the plurality of samples of the temperature, determining, by the appliance, whether the temperature exceeds a room temperature value upon an initialization of the cooktop element;

wherein obtaining, by the appliance, the plurality of samples of the temperature further comprises:

when it is determined that the temperature exceeds the room temperature value upon the initialization of the cooktop element, monitoring, by the appliance, the temperature to determine if the temperature exceeds a threshold value while collecting the plurality of samples of the temperature; and de-energizing, by the appliance, the cooktop element when it is determined that the temperature exceeds the threshold value.

* * * * *